UNITED STATES PATENT OFFICE.

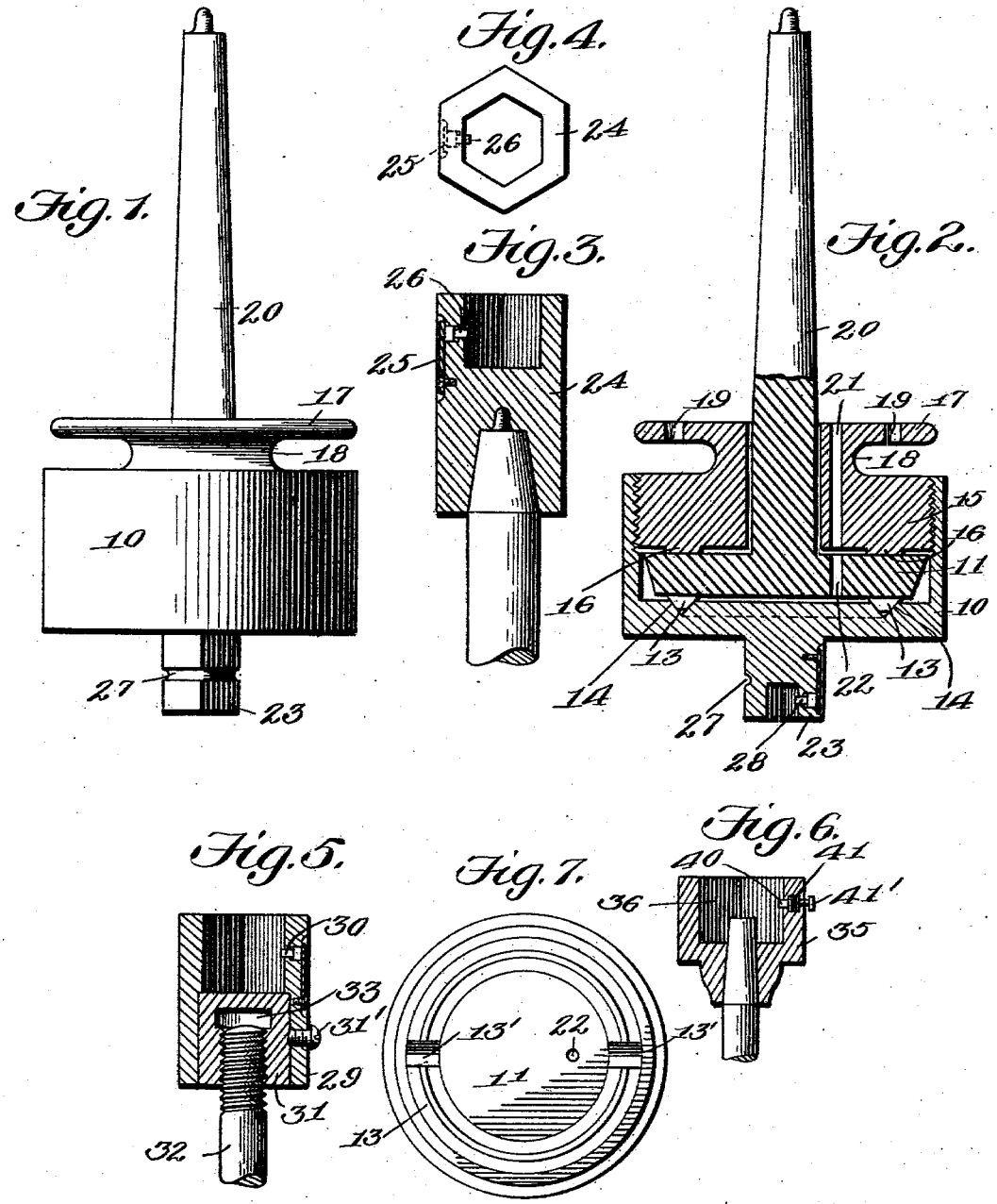

CHARLES CROSS ROBERTS, OF ANSONIA, CONNECTICUT.

FRICTION DRILL-CHUCK.

SPECIFICATION forming part of Letters Patent No. 715,298, dated December 9, 1902.

Application filed February 7, 1902. Serial No. 92,986. (No model.)

*To all whom it may concern:*

Be it known that I, CHARLES CROSS ROBERTS, a citizen of the United States, residing at Ansonia, in the county of New Haven and State of Connecticut, have invented new and useful Improvements in Friction Drill-Chucks, of which the following is a specification.

This invention relates to what I shall term a "friction drill-chuck," although it will be apparent from the following description that the device can be used with advantage for many different purposes.

The objects and advantages of the invention will be set forth at length in said description, while the novelty thereof will form the basis of the claims appended to said description, and said invention is clearly represented in the accompanying drawings, forming a part of this specification, and in which—

Figure 1 is a side elevation of a friction drill-chuck including my improvements. Fig. 2 is a longitudinal central section of the same. Fig. 3 is a similar view of a tool-holder adapted for carrying a drill. Fig. 4 is a plan view of the same. Fig. 5 is a similar view of a holder for carrying a stud. Fig. 6 is a detail view of a different form of tool-holder. Fig. 7 is a bottom plan view of the upper clutch-half.

Like characters refer to like parts in all the figures.

I desire at this point to state that the invention is not limited to the precise organization hereinafter set forth, for many changes may be made within the scope of my claims.

The friction drill-chuck shown in detail in Figs. 1 and 2 includes in its construction the coacting members 10 and 11. The clutch half or member 10 is shown as being cup-shaped to receive the complemental half 11, the fit being a snug one, although it will be seen that the periphery of the part 11 is tapered inwardly, so as not to cause undue friction between the same and the inner surface of the flange 12 of the cup-shaped part 10. What is shown as the under face of the part 11, which it will be seen is in the form of a disk, is adapted to frictionally engage the upper face of the bottom of the cup-shaped part, so that when the disk or clutch-half 11 is rotated it will serve by such frictional contact to rotate the clutch-half 10, although it will be seen that the said faces are not in contact throughout their entire areas, the driving effect of one being transmitted to the other by a projection on one of said parts adapted to be seated in a corresponding groove in the other.

The projection is denoted by 13, and it is shown as being annular and as depending from the under side of the clutch-half 11 and as fitted in a similar groove 14 on the adjacent face of the clutch-half 10, and the frictional contact between these parts is varied by suitable means, as the clamping-nut 15, threaded into the upper open end of the flanged portion of the clutch-half 10. The nut 15 does not bear throughout its entire surface against the upper face of the disk or clutch-half 11, but is furnished with an annular projection 16, depending therefrom, which engages the said upper face.

The nut 15 has a head 17 connected to the body thereof by a neck 18, and these parts for simplicity may be made in one piece, and the head, which is shown as being circular, has a series of perforations 19, in which the studs or projections of a bifurcated spanner-wrench (not shown) can be inserted to turn the nut into and out of its seat, so as to increase or decrease the frictional contact between the clutch parts 10 and 11.

The clutch-half 11 is in the nature of a head for the spindle 20, which, it will be seen, extends centrally from said clutch-half and projects through a central hole in the nut 15. The said clutch-half 11 is positively rotated through the spindle 20, said parts being shown as integral, and the spindle may be rotated in any convenient manner, though I have shown no means for this purpose.

The groove 14 is V-shaped in cross-section, and it will be seen that the coöperating projection 13 is of inverted-V form in cross-section, the sides of the projection being sloped to agree with that of the walls, and the projection is slotted at 13' at diametrically opposite points for the passage of oil.

The nut 15 and clutch-half 11 are bored at 21 and 22, respectively, for the passage of oil, which is introduced primarily into the bore 21 and flows from thence into the space between the said nut and clutch-half and then enters the bore or passage 22, so as to lubricate the engaging portions of said clutch members, and the oil can flow down the inner inclined wall of the groove 14 and lodge in the bottom of said groove, and thereby lubricate the outer inclined wall of said groove.

The clutch-half 10 has on its under side, centrally thereof, the polygonal projection 23, shown as hexagonal, which is adapted to enter a correspondingly-shaped socket in the tool-holder, the opposite end of the said tool-holder having a tapered socket to receive the shank of a drill.

In the face of the tool-holder 24 a longitudinal groove is formed, and a spring 25 is located in the same, one end of the spring being suitably secured to said holder, while the other or free end thereof is provided with a pin 26, seated in a transverse bore in the tool-holder, and the inner end of the pin when the tool-holder is slipped over the hexagonal projection 23 is adapted to be thrust into the groove 27 in said projection, so as to prevent the tool-holder from dropping off, it being understood that the spring is a comparatively light one, so that the tool-holder can be pulled by hand from the projection 23. As the projection 23 is hexagonal externally and fits in a similar-shaped socket in the tool-holder 24, the latter will be rotated, so as to feed a drill into the work.

It will be assumed that it is desired to form a tapped hole. To do this, a drill of proper size will be inserted in the tool-holder 24 and the latter put on the projection 23, so that on the rotation and advancing movement of the chuck the drill will be caused to enter the work, and after a hole of proper depth has been formed the drill will be backed out and then its holder will be taken from the projection. The shank of a tap can then be inserted in a socket in the projection 23 and held by the pin 28, operating and mounted precisely like the pin 26, hereinbefore described, or the shank of said tap can be inserted in a socket in a holder just like the holder 24, previously described, except that the socket for the tap is not tapered, as is the case with the drill-socket. The tap will then be fed into the drill-hole to cut threads in the wall thereof.

In case the drill should be obstructed from any cause when forming a hole the friction-half 11 will slip over its companion 10, so as not to injure the cutting edge of said drill, and in like manner when the bottom of the drilled hole is encountered by the tap said part 11 will slip along its mate 10 without causing any shock to the parts.

By reason of the annular projection 13, substantially V-shaped in cross-section, and its coacting groove 14 it is possible to cause the drill-tap or other tool, as the case may be, to enter the work true or straight, and it will be understood that the tool or tool-holder is rotated without the necessity of employing keys or feathers, as in case the same are present they soon become loose.

In Fig. 5 I have shown a holder 29 for use in setting studs, and it is provided at one end with a polygonal socket to fit over the similarly-shaped projection 23 and is held thereon by a spring-actuated pin 30, like the pins 26 and 28, hereinbefore described. The holder 29 has also a socket to receive a nut 31, the nut being removable, and it is held in place by a screw 31', tapped into the holder and adapted to engage the nut. By slightly running the screw out of its seat the nut can be easily slipped out of its socket to receive one having a threaded hole of a greater or less size, so as to readily adapt the device for setting studs of different sizes. The bottom of the hole that receives the stud 32 has a clearance-space 33 greater in diameter than the main portion of said hole, so that when the lower end of the stud strikes the bottom of its hole and the clutch is backed away there is no tendency to carry the stud therewith.

The thread of the nut 15 is a left one, so that in case the parts of the clutch should cut or grind on each other by lack of oil the nut will be screwed out, so as not to injure the tool.

In Fig. 6 I have shown a modified form of tool-holder, the same being denoted by 35 and being socketed for the reception of a drill-shank. Said tool-holder has a further socket 36, the inner wall of which is hexagonal, and which socket is adapted to receive the projection 23, hereinbefore described. The tool-holder 35 is bored at a suitable point to receive the pin 40, which is adapted to be forced into the groove 27 by the coiled spring 41, the tension of which is regulated by the screw 41', tapped into said tool-holder.

Having described the invention, what I claim is—

1. In a chuck of the class described, a cup-shaped clutch member, a disk fitted in the same and constituting a second clutch member and one of said members being provided with an annular projection and the other having an annular groove to receive said projection, and said projection having a slot for the passage of oil, a nut fitted in said cup-shaped clutch member and adapted to bear against said disk, a projection exterior of the cup-shaped clutch member, having a circumferential channel, a tool-holder adapted to be detachably connected with said projection, and said projection and holder having an engaging polygonal face and the tool-holder being provided with a pin adapted to enter said channel.

2. In a chuck of the class described, a cup-shaped clutch member and a disk fitted in the same and constituting a second clutch member, and one of said parts being provided with an annular projection and the other having an annular groove to receive said projection, and said projection having a slot for the passage of oil, and a nut fitted in said cup-shaped clutch member and adapted to bear against said disk.

3. In a chuck of the class described, a cup-shaped clutch member having an annular groove in its bottom substantially V-shaped in cross-section, a disk in said clutch member having an annular projection corresponding in cross-sectional shape with and adapted to fit into said groove and said projection having a slot for the passage of oil, and a device fitted in said cup-shaped clutch member and serving to hold the disk in contact therewith.

4. In a chuck of the class described, a cup-shaped clutch member, a disk within the same, and a nut fitted within said cup-shaped clutch member and having an annular projection on its inner face adapted to bear against the adjacent face of said disk.

5. In a chuck of the class described, a cup-shaped clutch member having an annular groove in its bottom, a disk fitted in the said cup-shaped clutch member and having an annular projection adapted to fit said groove said projection having a slot for the passage of oil, and a nut fitted in said cup-shaped clutch member and having an annular projection on its inner face adapted to bear against the adjacent face of the disk.

6. In a chuck of the class described, a cup-shaped clutch member having an annular groove in its bottom, a disk fitted in said cup-shaped clutch member and constituting a second clutch member and having an annular projection adapted to enter said groove said disk having a bore for the passage of oil and the projection having a slot for the passage of oil, and a nut fitted in said cup-shaped clutch member and having an annular projection adapted to bear against said disk and also having a bore for the passage of oil.

7. In a chuck of the class described, a cup-shaped clutch member having an annular groove in its bottom, a disk fitted in said cup-shaped clutch member and constituting a second clutch member and having an annular projection adapted to enter said groove said disk having a bore for the passage of oil and the projection having a slot for the passage of oil, and a nut fitted in said cup-shaped clutch member and having an annular projection adapted to bear against said disk and also having a bore for the passage of oil, said nut also having a neck and a circular head at the outer end of the same and said head having openings for the reception of the pins of a spanner-wrench.

In testimony whereof I have hereunto set my hand in presence of two subscribing witnesses.

CHARLES CROSS ROBERTS.

Witnesses:
S. E. MANVILLE,
AUSTIN P. KIRKHAM.